US009669797B2

(12) United States Patent
Friedman

(10) Patent No.: US 9,669,797 B2
(45) Date of Patent: Jun. 6, 2017

(54) LOCKING HARNESS

(71) Applicant: Mark J. Friedman, Niskayuna, NY (US)

(72) Inventor: Mark J. Friedman, Niskayuna, NY (US)

(73) Assignee: Friedman IP Holdings, LLC, Schenectady, NY (US)

( * ) Notice: Subject to any disclaimer, the term of this patent is extended or adjusted under 35 U.S.C. 154(b) by 62 days.

(21) Appl. No.: 14/984,232

(22) Filed: Dec. 30, 2015

(65) Prior Publication Data

US 2016/0107607 A1   Apr. 21, 2016

Related U.S. Application Data

(60) Continuation of application No. 14/481,016, filed on Sep. 9, 2014, now Pat. No. 9,561,776, which is a division of application No. 13/653,540, filed on Oct. 17, 2012, now Pat. No. 8,851,575, which is a division of application No. 12/703,227, filed on Feb. 10, 2010, now Pat. No. 8,333,433.

(51) Int. Cl.
*B60R 22/12* (2006.01)
*B60N 2/28* (2006.01)
*B60R 22/10* (2006.01)
*B60R 22/36* (2006.01)
*B60R 22/48* (2006.01)

(52) U.S. Cl.
CPC ............ *B60R 22/12* (2013.01); *B60N 2/2803* (2013.01); *B60N 2/2812* (2013.01); *B60R 22/105* (2013.01); *B60R 22/36* (2013.01); *B60R 22/48* (2013.01); *A44D 2200/12* (2013.01); *B60N 2002/2815* (2013.01); *Y10S 24/38* (2013.01); *Y10T 24/4012* (2015.01); *Y10T 24/45529* (2015.01); *Y10T 29/49826* (2015.01)

(58) Field of Classification Search
None
See application file for complete search history.

(56) References Cited

U.S. PATENT DOCUMENTS

| 594,006 | A | 11/1897 | Gorton |
|---|---|---|---|
| 2,084,412 | A | 6/1937 | Schaefer |
| 2,228,379 | A | 11/1939 | Woodard |
| 2,403,712 | A | 10/1944 | Elwell |
| 3,586,220 | A | 6/1971 | Reinsberg |
| 3,649,076 | A | 3/1972 | Blake |

(Continued)

FOREIGN PATENT DOCUMENTS

JP    2008105552    5/2005

*Primary Examiner* — David E Allred
(74) *Attorney, Agent, or Firm* — Mark J. Friedman

(57) ABSTRACT

A retainer apparatus including a first retainer portion, a second retainer portion, a transceiver, and a sensor comprising a motion detector. The retainer apparatus includes the first retainer portion configured to be slidably attached to a first harness strap and a second retainer portion configured to be slidably attached to a second harness strap. The first retainer portion is removably attached to the second retainer portion. The motion detector is configured to detect movement of the retainer apparatus and transmit a warning signal, via the transceiver, to a controller within a vehicle comprising the retainer apparatus to alert a user in the vehicle if the movement is detected.

20 Claims, 7 Drawing Sheets

(56) References Cited

U.S. PATENT DOCUMENTS

| | | |
|---|---|---|
| 3,672,004 A | 6/1972 | Smith |
| 3,872,197 A | 3/1975 | Kato et al. |
| 3,988,098 A | 10/1976 | Kato et al. |
| 3,996,929 A | 12/1976 | Mabuchi |
| 4,323,204 A | 4/1982 | Takada |
| 4,491,343 A | 1/1985 | Foehl |
| 4,492,348 A | 1/1985 | Ziv et al. |
| 4,554,779 A | 11/1985 | Fischer |
| 4,569,106 A | 2/1986 | Lovato |
| 4,569,629 A | 2/1986 | Ferris et al. |
| 4,800,629 A | 1/1989 | Ikeda |
| 4,810,036 A | 3/1989 | Buser |
| 4,973,083 A | 11/1990 | Richards et al. |
| 5,029,896 A | 7/1991 | Ernst |
| 5,037,135 A | 8/1991 | Kotikovsky et al. |
| 5,151,678 A | 9/1992 | Veltri et al. |
| 5,411,292 A | 5/1995 | Collins et al. |
| 5,498,017 A | 3/1996 | Rohrmoser |
| 5,566,427 A | 10/1996 | Lathrop |
| 5,669,118 A | 9/1997 | Frano et al. |
| 5,735,024 A | 4/1998 | Ortiz |
| 5,774,947 A | 7/1998 | Anscher |
| 5,839,789 A | 11/1998 | Koledin |
| 5,839,793 A | 11/1998 | Merrick et al. |
| 5,852,852 A | 12/1998 | Rigal |
| 5,873,635 A | 2/1999 | Merrick |
| 6,002,325 A | 12/1999 | Conaway |
| 6,079,662 A | 6/2000 | Miller et al. |
| 6,079,744 A | 6/2000 | Husby et al. |
| 6,142,524 A * | 11/2000 | Brown ............ B60R 21/01546 180/268 |
| 6,220,662 B1 | 4/2001 | Franco-Vila et al. |
| 6,357,091 B1 | 3/2002 | Devereaux |
| 6,367,882 B1 | 4/2002 | Van Druff et al. |
| 6,447,060 B1 | 9/2002 | Vila et al. |
| 6,543,097 B2 | 4/2003 | Burt et al. |
| 6,662,413 B2 | 12/2003 | Glover |
| 6,824,222 B2 | 11/2004 | Maloney et al. |
| 6,922,154 B2 | 7/2005 | Kraljic et al. |
| 7,367,092 B1 | 5/2008 | Dilday |
| 7,445,293 B2 | 11/2008 | Smith et al. |
| 7,466,221 B1 | 12/2008 | Lehr |
| 7,642,907 B2 | 1/2010 | Tang et al. |
| 7,964,130 B2 | 6/2011 | You |
| 8,195,365 B2 | 6/2012 | Bernhagen et al. |
| 8,262,133 B2 | 9/2012 | Usoro et al. |
| 8,333,433 B2 | 12/2012 | Friedman |
| 8,648,735 B2 | 2/2014 | Haynes et al. |
| 8,714,114 B1 | 5/2014 | Wang et al. |
| 8,851,575 B2 | 10/2014 | Friedman |
| 9,440,777 B2 | 9/2016 | Prescott |
| 2002/0029443 A1 | 3/2002 | Ortiz |
| 2003/0075969 A1 | 4/2003 | Fromme et al. |
| 2003/0122662 A1 | 7/2003 | Quinonez |
| 2003/0160689 A1 | 8/2003 | Yazdgerdi |
| 2005/0091808 A1 | 5/2005 | Uehara et al. |
| 2005/0229867 A1 | 10/2005 | Green |
| 2005/0280297 A1 | 12/2005 | Patterson et al. |
| 2006/0218761 A1 | 10/2006 | Anscher |
| 2006/0231373 A1 | 10/2006 | Taylor et al. |
| 2006/0289575 A1 | 12/2006 | Chou |
| 2007/0096891 A1 | 5/2007 | Sheriff et al. |
| 2007/0102989 A1 | 5/2007 | Smith et al. |
| 2007/0102990 A1 | 5/2007 | Smith et al. |
| 2007/0193004 A1 | 8/2007 | Chou |
| 2007/0283540 A1 | 12/2007 | Chang |
| 2008/0223888 A1 | 9/2008 | Meunier |
| 2009/0079557 A1 | 3/2009 | Miner |
| 2009/0179406 A1 | 7/2009 | Haraoka et al. |
| 2010/0244543 A1 | 9/2010 | Fine et al. |
| 2010/0253498 A1 | 10/2010 | Rork et al. |
| 2013/0038101 A1 | 2/2013 | Friedman |
| 2013/0291344 A1 | 11/2013 | Hortnagl |
| 2014/0035338 A1 | 2/2014 | Greenwood et al. |
| 2014/0375093 A1 | 12/2014 | Friedman |
| 2015/0013619 A1 | 1/2015 | Kahana, Jr. |
| 2015/0113770 A1 | 4/2015 | Laatz |
| 2015/0209052 A1 | 7/2015 | Hopman et al. |
| 2016/0183636 A1 | 6/2016 | Laatz |

\* cited by examiner

LOCKING HARNESS

CROSS-REFERENCE TO RELATED APPLICATIONS

This application is continuation application claiming priority to Ser. No. 14/481,016 filed Sep. 9, 2014 which is a divisional application claiming priority to Ser. No. 13/653,540 filed Oct. 17, 2012, now U.S. Pat. No. 8,851,575 issued Oct. 7, 2014 which is a divisional application of Ser. No. 12/703,227 filed Feb. 10, 2010, and entitled "Locking Harness Apparatus and Method", now U.S. Pat. No. 8,333,433, issued Dec. 18, 2012.

FIELD OF TECHNOLOGY

The present invention relates to a locking restraint apparatus and associated method for restraining an individual in a vehicle for preventing motion related injuries.

BACKGROUND

Restraining users during travel typically comprises an inefficient process with little flexibility. Accordingly, there exists a need in the art to overcome at least some of the deficiencies and limitations described herein above.

SUMMARY

The present invention provides a retainer apparatus comprising: a first retainer portion configured to be slidably attached to a first adjustable harness strap of a car seat; a second retainer portion configured to be slidably attached to a second adjustable harness strap of a car seat, wherein said first retainer portion is removably attached to said second retainer portion; a transceiver; and a sensor comprising a motion detector, wherein said motion detector is configured to detect movement of said retainer apparatus, and wherein said motion detector is configured transmit a warning signal, via said transceiver, to a controller within a vehicle comprising said retainer apparatus to alert a user in said vehicle if said movement of said retainer apparatus is detected.

The present invention provides a retainer apparatus comprising: a first retainer portion configured to be slidably attached to a first adjustable harness strap of a car seat; a second retainer portion configured to be slidably attached to a second adjustable harness strap of said car seat, wherein said first retainer portion is removably attached to said second retainer portion; and a sensor comprising a motion detector and an alarm, wherein said motion detector is configured to detect movement of said retainer apparatus, and wherein said alarm is configured to alert a user if said movement of said first retainer apparatus is detected.

The present invention provides a car seat apparatus comprising: a first adjustable harness strap; a second adjustable harness strap; a retainer apparatus comprising a first retainer portion slidably attached to said first harness strap and a second retainer portion slidably attached to said second harness strap, wherein said first retainer portion is removably attached to said second retainer portion, wherein said retainer apparatus further comprises a transceiver and a sensor comprising a motion detector, wherein said motion detector is configured to detect movement of said retainer apparatus, wherein said motion detector is configured transmit a warning signal, via said transceiver, to a controller within a vehicle comprising said car seat apparatus to alert a user in said vehicle if said movement of said retainer apparatus is detected; and a car seat structure comprising a harness apparatus mechanically attached to said car seat structure, wherein said retainer apparatus, said first adjustable harness strap, and said second adjustable harness strap are comprised by said harness apparatus, and wherein said harness apparatus is configured to restrain an occupant of said car seat apparatus and prevent said occupant from being ejected from said car seat apparatus.

The present invention advantageously provides a simple apparatus and associated method capable of restraining users during travel.

DETAILED DESCRIPTION

Figure 1:
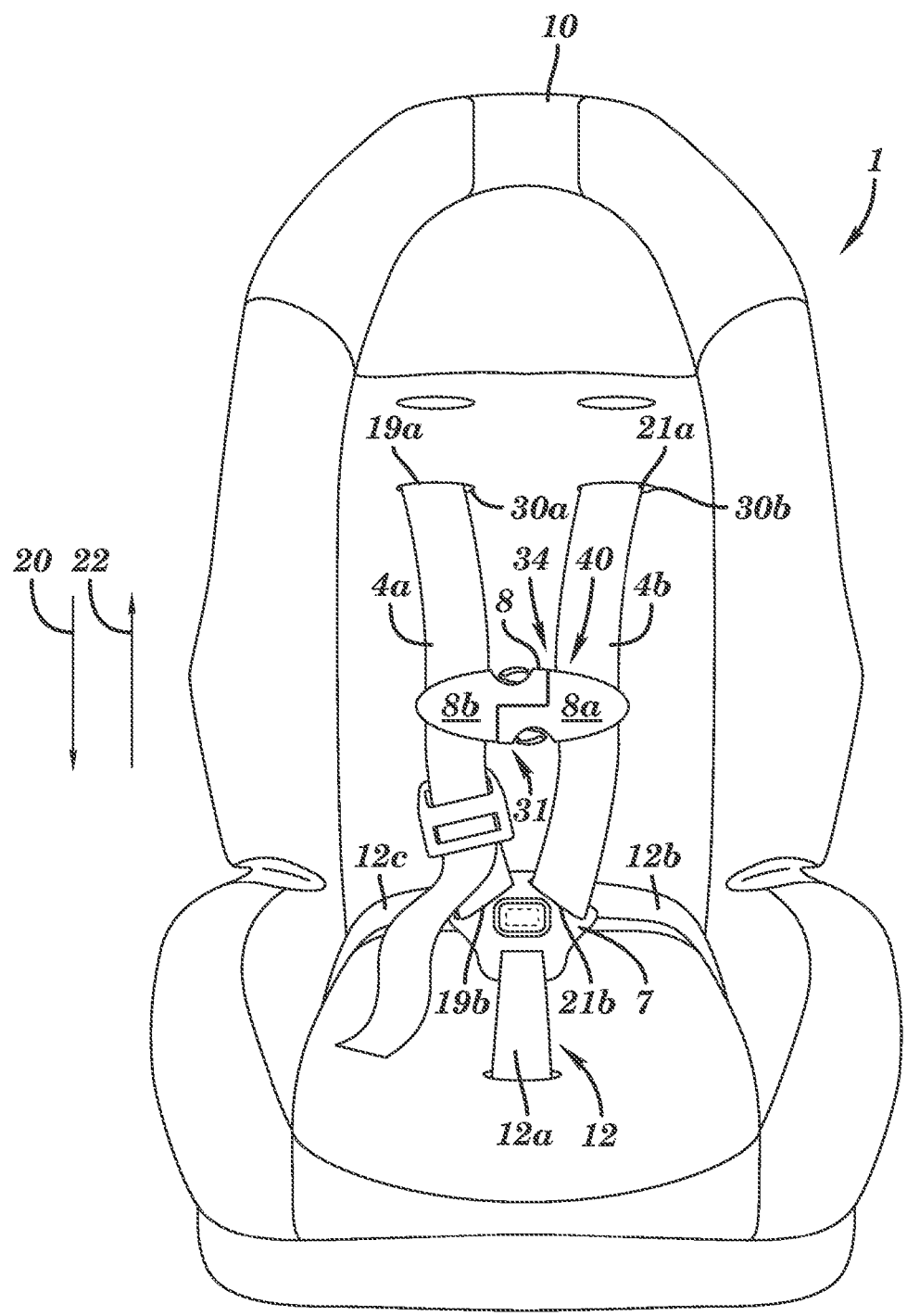
FIG. 1 illustrates a locking restraint apparatus for safely restraining an individual during travel in a vehicle, in accordance with embodiments of the present invention.
Figure 3:
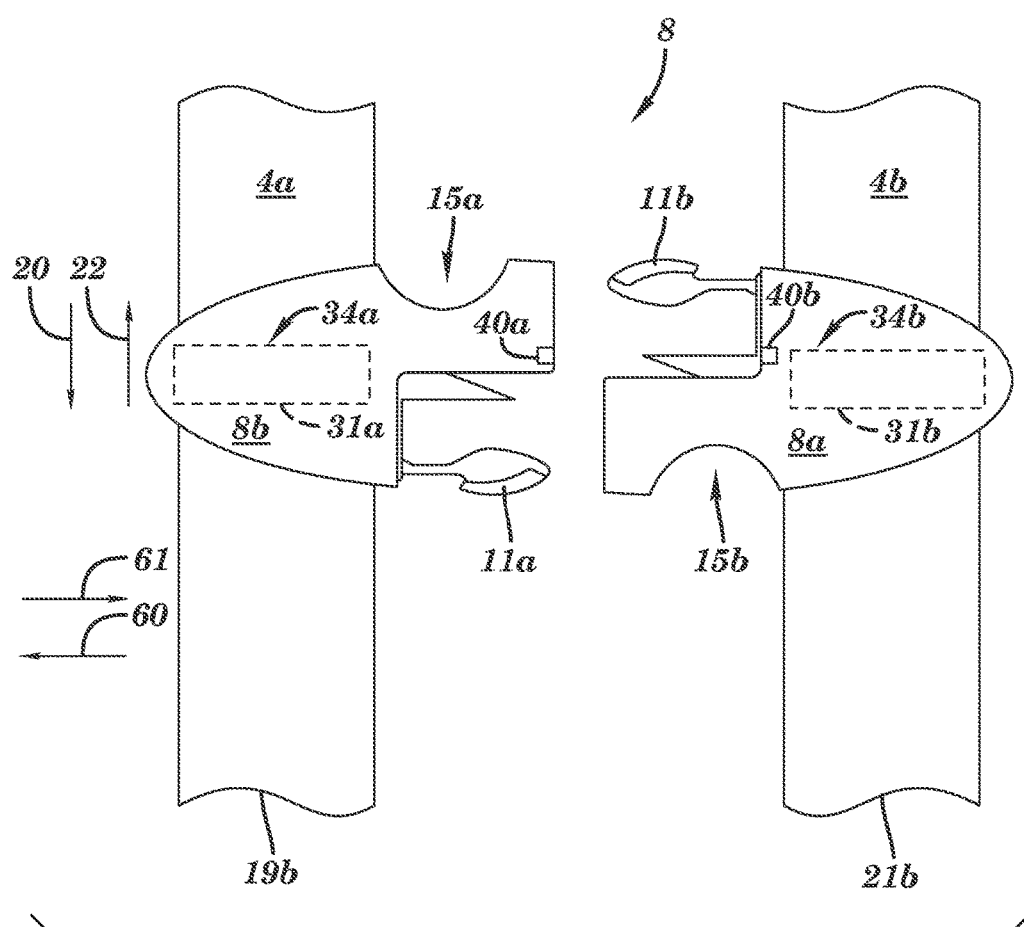
FIG. 3 illustrates a close up view of the retainer apparatus 8 of FIG. 1 slidably attached to adjustable harness straps, in accordance with embodiments of the present invention.
Figure 4A:
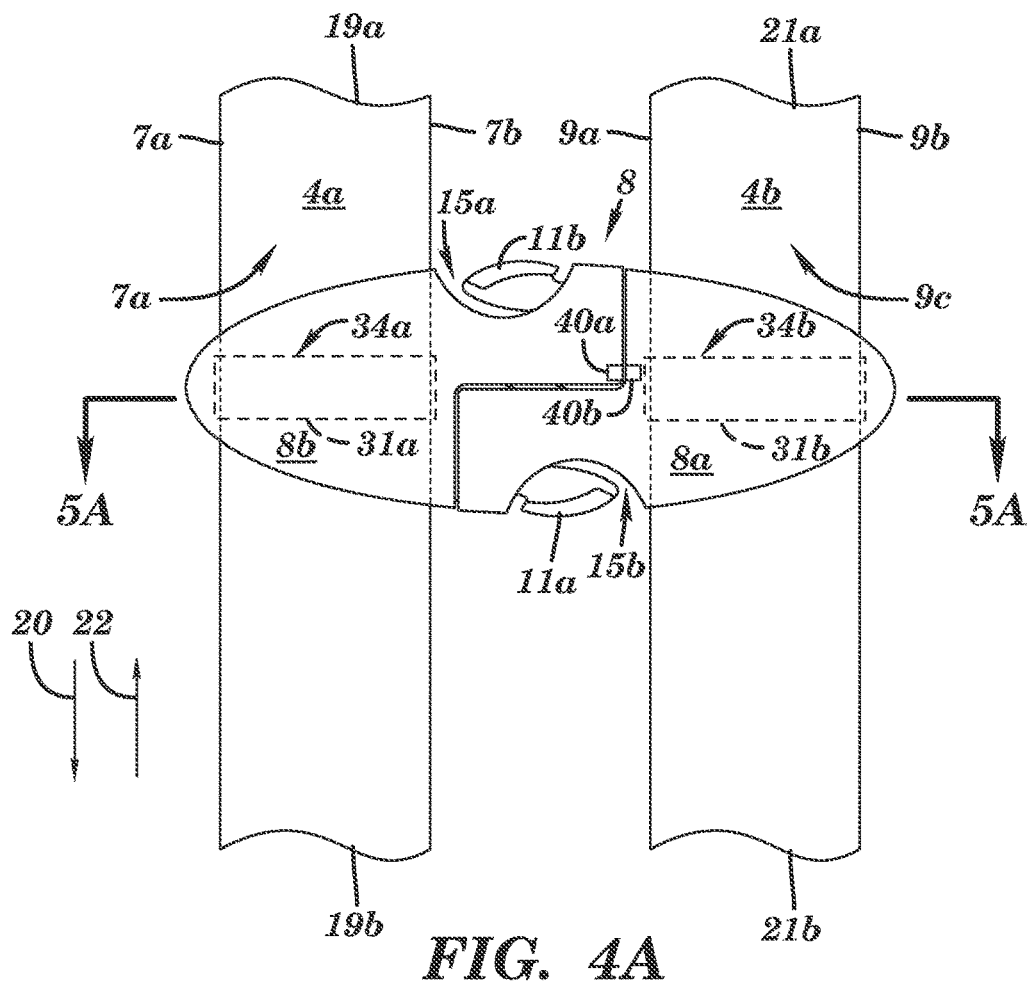
FIG. 4A illustrates an alternative to FIG. 3, in accordance with embodiments of the present invention.

FIG. 1 illustrates a restraint apparatus 1 for safely restraining an individual (e.g., a person) during travel in a vehicle, in accordance with embodiments of the present invention. Restraint apparatus 1 may be used in any type of vehicle including, inter alia, an automobile, an aircraft, a boat, etc. Restraint apparatus 1 comprises a seat structure 10 (e.g., a car seat), an adjustable harness strap 4a, an adjustable harness strap 4b, a retainer apparatus 8 slidably attached to adjustable harness strap 4a and adjustable harness strap 4b, and a harness portion 12. Adjustable harness strap 4a and adjustable harness strap 4b are configured to restrain an upper body portion of a person (e.g., see upper body portion 17a child 14 in FIG. 2, infra). An upper body portion (e.g., upper body portion 17a in FIG. 2) is defined herein as any portion of a body located above (i.e., in direction 20) a waist section (e.g., see waist section 17 in FIG. 2, infra). Adjustable harness strap 4a is removably attached to seat structure 10. Adjustable harness strap 4a extends from seat structure 10 through opening 30a to buckle structure 7. Adjustable harness strap 4a is removably attached to buckle structure 7. Adjustable harness strap 4b is removably attached to seat structure 10. Adjustable harness strap 4b extends from seat structure 10 through opening 30b to buckle structure 7. Adjustable harness strap 4b is removably attached to buckle structure 7. Retainer apparatus 8 comprises a retainer portion 8a, a retainer portion 8b, a braking mechanism 31, an optional motion detector/sensor/alarm apparatus 40, and an optional electrical motor/signal receiving device 34. Retainer portion 8a is slidably attached to harness strap 4a. Retainer portion 8b is slidably attached to harness strap 4b. Retainer apparatus 8 is configured to slidably move along harness strap 4a and harness strap 4b in a direction 20 and 22 and between ends 19a and 19b of harness strap 4a and ends 21a and 21b of harness strap 4b. Braking mechanism 31 is configured to adjustably prevent retainer portion 8a and retainer portion 8b from slidably moving along 4a harness strap and harness strap 4b. Braking mechanism 31 is configured to hold retainer portion 8a and retainer portion 8b at any stationary position along harness strap 4a and harness strap 4b. Braking mechanism 31 is configured to hold retainer portion 8a at any stationary position between portion 19a and portion 19b of harness strap 4a. Braking mechanism 31 is configured to hold retainer portion 8b at any stationary position between portion 21a and portion 21b of harness strap 4b. Retainer portion 8a is removably attached to retainer portion 8b (e.g., using clips 11a and 11b removably attached to openings 15a and 15b respectively as illustrated in FIGS. 3 and 4A, infra). Braking mechanism 31 comprises a braking device(s) (e.g. devices 37a, 37b, 38a, and 38b in FIG. 4B as described, infra) for applying resistance to harness strap 4a and/or harness strap 4b for holding retainer apparatus 8 in any stationary position along harness strap 4a and harness strap 4b. Optional electrical motor/signal receiving device 34 may comprise a signal receiving/transmitting device (e.g., a wireless transceiver) and/or an electrical motor or solenoid. Optional electrical motor/signal receiving device 34 is configured to accept a control signal (i.e., via a signal receiving/transmitting device) from a control device (e.g., a computer/controller in a vehicle) and automatically (e.g., in accordance with the control signal enabled by a user) slidably move (i.e., using an electrical motor) retainer apparatus 8 along harness strap 4a and harness strap 4b in direction 20 and/or 22 until a disable control signal is received by the signal receiving/transmitting device. Alternatively, optional electrical motor/signal receiving device 34 may be configured to accept a control signal (i.e., via a signal receiving/transmitting device) from a control device (e.g., a computer/controller in a vehicle) and automatically (e.g., in accordance with the control signal enabled by a user) slidably move (i.e., using an electrical motor) retainer apparatus 8 along harness strap 4a and harness strap 4b (i.e., in direction 20 and/or 22) a predetermined or specified distance (e.g., data comprising specified distances may be stored within a memory structure located within retainer apparatus 8 and/or a computer/controller in a vehicle). Optional motion detector sensor/alarm apparatus 40 may comprise a motion detector and/or an alarm. The motion detector detects any movement of retainer apparatus 8 (e.g., in direction 20 or 22, retainer portion 8a disconnected from retainer portion 8b, etc) and either activates a warning alarm located within sensor/alarm apparatus 40 or transmits a warning signal to a computer/controller in a vehicle to warn a user (e.g., a driver) that movement of retainer apparatus 8 has been detected thereby allowing the user to re-secure an individual (e.g., a child) in restraint apparatus 1. Harness portion 12 comprises a first portion 12a, a second portion 12b, and a third portion 12c mechanically attached (i.e., removably or not removably) to buckle structure 7. Harness portion 12 is configured to restrain a lower body portion of a person (e.g., see lower body portion 17b of child 14 in FIG. 2, infra). A lower body portion (e.g., lower body portion 17b in FIG. 2) is defined herein as any portion of a body located below (i.e., in direction 22) a waist section (e.g., see waist section 17 in FIG. 2, infra). Restraint apparatus 1 may additionally comprise an additional retainer apparatus(s) (i.e., not shown and similar to or the same as retainer apparatus 8 comprising braking mechanism 31) slidably attached to adjustable harness strap 4a and adjustable harness strap 4b to provide additional restraint capabilities for restraint apparatus 1.

Figure 2:
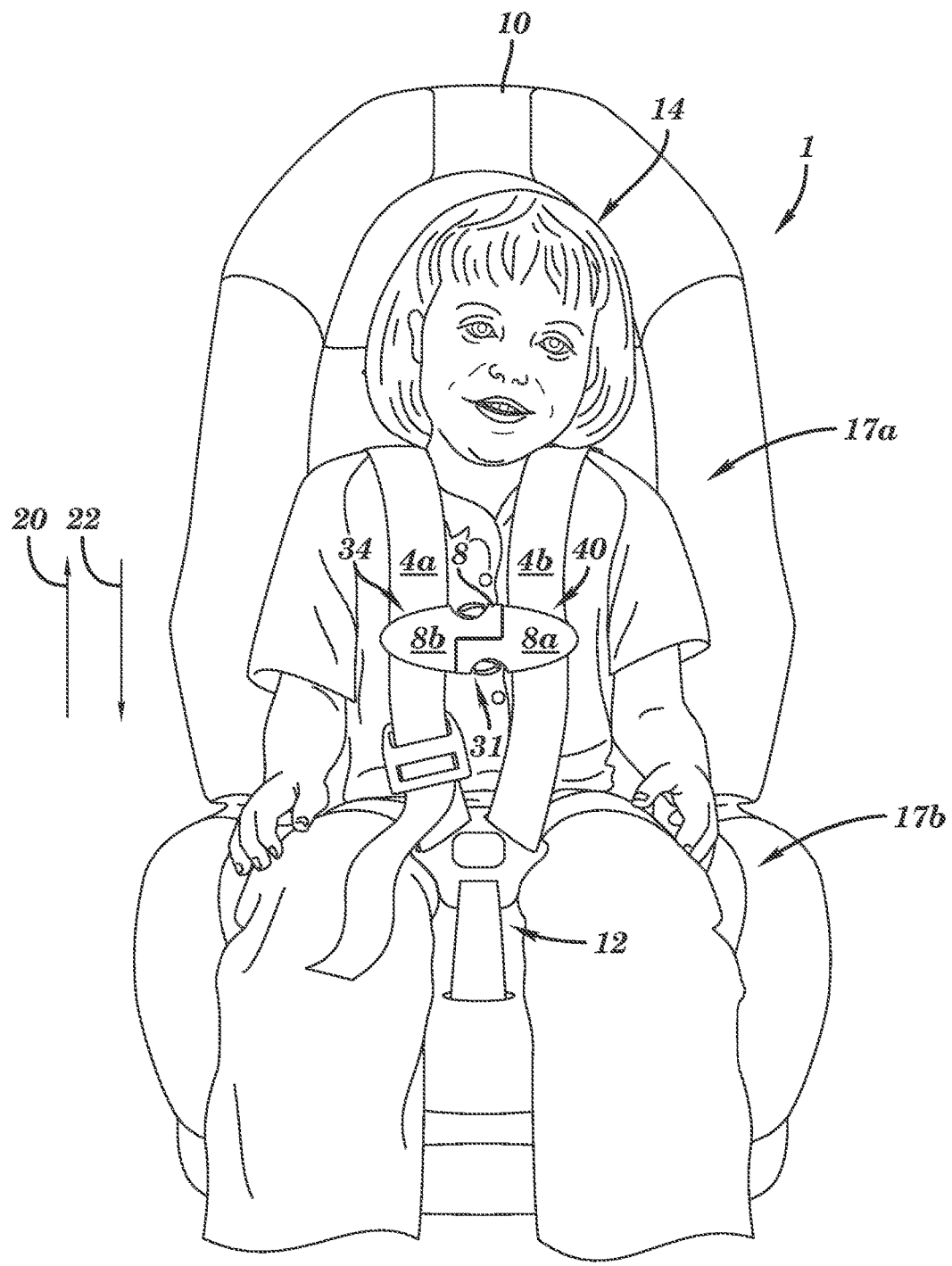
FIG. 2 illustrates the restraint apparatus of FIG. 1 safely restraining an individual during travel in a vehicle, in accordance with embodiments of the present invention.

FIG. 2 illustrates restraint apparatus 1 of FIG. 1 safely restraining an individual 14 during travel in a vehicle, in accordance with embodiments of the present invention. Individual 14 comprises a waist section 17 used to define an upper body portion 17a and a lower body portion 17b.

FIG. 3 illustrates a close up view of retainer apparatus 8 of FIG. 1 slidably attached to adjustable harness strap 4a and adjustable harness strap 4b, in accordance with embodiments of the present invention. In FIG. 3, retainer portion 8a is disconnected from retainer portion 8b. Retainer portion 8a is disconnected from retainer portion 8b by disabling using clips 11a and 11b from openings 15a and 15b, respectively. Retainer portion 8a is moved towards retainer portion 8b in a direction 60 and retainer portion 8b is moved towards retainer portion 8a in a direction 61 in order to latch clip 11b to opening 15a and latch clip 11a to opening 15b (i.e., as illustrated in FIG. 4, infra). FIG. 3 additionally illustrates a close up view of braking mechanism 31 (i.e., comprising braking mechanism portions 31a and 31b), optional motion detector sensor/alarm apparatus 40 (i.e., comprising motion detector sensor/alarm apparatus portions 40a and 40b), and optional electrical motor/signal receiving device 34 (i.e., comprising electrical motor/signal receiving device portions 34a and 34b). Each of braking mechanism portion 31a, motion detector sensor/alarm apparatus portion 40a, and electrical motor/signal receiving device portion 34a is mechanically attached to retainer portion 8a. Each of braking mechanism portion 31b, motion detector sensor/alarm apparatus portion 40b, and electrical motor/signal receiving device portion 34b is mechanically attached to retainer portion 8b.

FIG. 4A illustrates an alternative to FIG. 3, in accordance with embodiments of the present invention. In contrast to FIG. 3, FIG. 4A illustrates retainer portion 8a removably attached to retainer portion 8b using clips 11a and 11b removably attached to openings 15a and 15b. Additionally, FIG. 4 illustrates cut away line 5A-5A applicable to the cross sectional views of FIGS. 4B-4D as described infra.

Figure 4B:
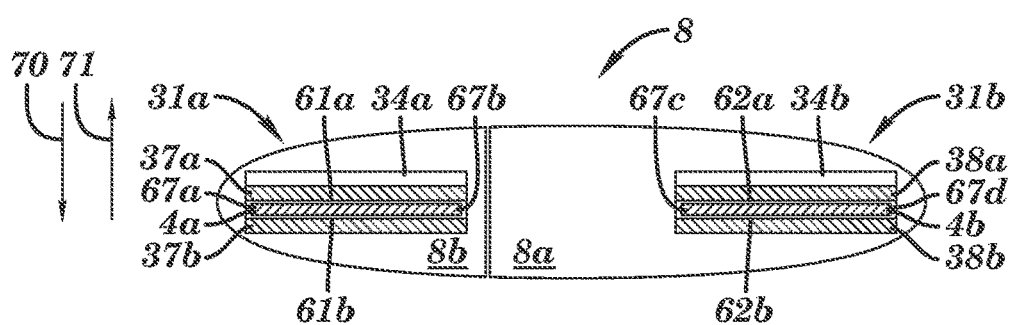
FIG. 4B illustrates a cross sectional view of the retainer apparatus of FIG. 4A, in accordance with embodiments of the present invention.

FIG. 4B illustrates a cross sectional view of retainer apparatus 8 taken at cut away line 5A-5A of FIG. 4A, in accordance with embodiments of the present invention. FIG. 4B illustrates a cross sectional view of retainer portions 8a and 8b, braking mechanism portions 31a and 31b, electrical motor/signal receiving device portions 34a and 34b, and adjustable harness straps 4a and 4b. Braking mechanism portion 31a comprises a first section 37a and a second section 37b. In order to engage braking mechanism portion 31a, first section 37a is moved in direction 70 until contact is made with surface 61a of adjustable harness strap 4a and second section 37b is moved in direction 71 until contact is made with surface 61b of adjustable harness strap 4a. First section 37a is locked to second section 37b (i.e., upon contact with adjustable harness strap 4a to prevent movement of retainer portion 8b) using any means including, inter alia, clips, locking devices, screws, spring loaded latches (e.g., as described with respect to FIG. 4C, infra), magnetic means, an electro/mechanical device such as a solenoid or an electrical motor, etc. Additionally, first section 37a, surface 61a, second section 37b, and/or surface 61b may each include a frictional material (e.g., sandpaper type material, rubber, teeth (e.g., as illustrated in FIG. 4D, infra), etc) to create friction and cause resistance to movement. Alternatively, first section 37a, surface 61a, second section 37b, and/or surface 61b may each include a magnetic material (e.g., standard magnetic material, electromagnetic structure such as an electromagnet, etc) to cause resistance to movement. The aforementioned contact and locking process causes a resistance to movement between adjustable harness strap 4a (i.e., on any portion of adjustable harness strap 4a such as edge sections 67a and 67b or any surface of adjustable harness strap 4a) and braking mechanism portion 31a thereby holding (or locking) retainer portion 8b in a stationary position at a user selected location anywhere on adjustable harness strap 4a. Braking mechanism portion 31b comprises a first section 38a and a second section 38b. In order to engage braking mechanism portion 31b, first section 38a is moved in direction 20 70 until contact is made with surface 62a of adjustable harness strap 4b and second section 38b is moved in direction 71 until contact is made with surface 62b of adjustable harness strap 4b. First section 38a is locked to second section 38b (i.e., upon contact with adjustable harness strap 4b to prevent movement of retainer portion 8a) using any means including, inter alia, clips, locking devices, screws, spring loaded latches (e.g., as described with respect to FIG. 4C, infra), magnetic means, a solenoid, etc. Additionally, first section 38a, surface 62a, second section 38b, and/or surface 62b may each include a frictional material (e.g., sandpaper type material, rubber, teeth (e.g., as illustrated in FIG. 4D, infra), etc) to create friction and cause resistance to movement. Alternatively, first section 38a, surface 62a, second section 38b, and/or surface 62b may each include a magnetic material (e.g., standard magnetic material, electromagnetic structure, etc) to cause resistance to movement. The aforementioned contact and locking process causes a resistance to movement between adjustable harness strap 4b (i.e., on any portion of adjustable harness strap 4b such as edge sections 67c and 67d or any surface of adjustable harness strap 4b) and braking mechanism portion 31b thereby holding (or locking) retainer portion 8a in a stationary position at user selected location anywhere on adjustable harness strap 4b.

Figure 4C:
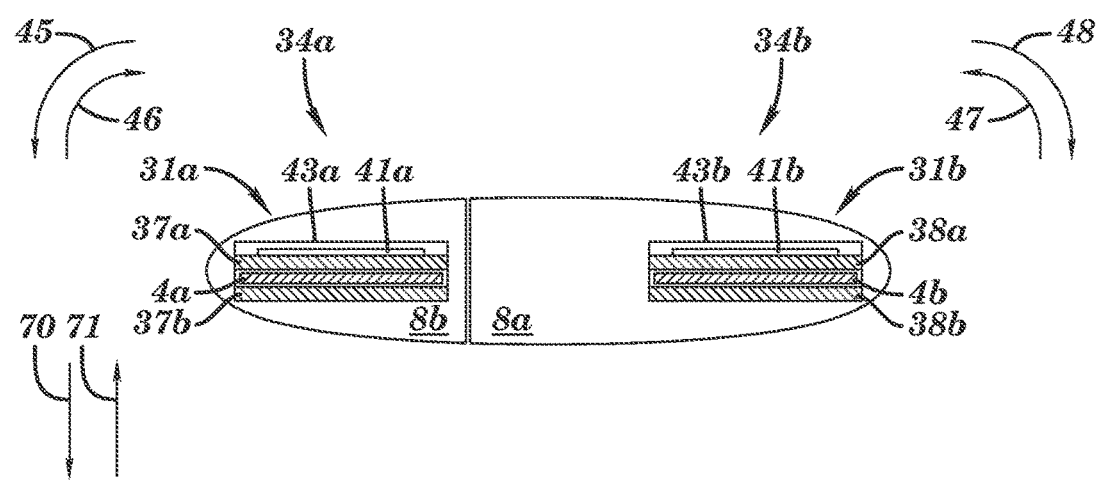
FIG. 4C illustrates a first alternative cross sectional view of the retainer apparatus of FIG. 4B, in accordance with embodiments of the present invention.
Figure 4D:
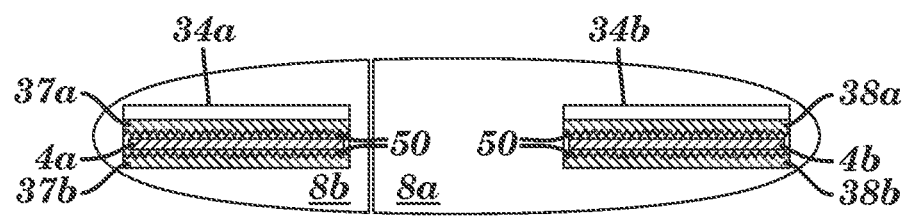
FIG. 4D illustrates a second alternative cross sectional view of the retainer apparatus of FIG. 4B, in accordance with embodiments of the present invention.

FIG. 4C illustrates a first alternative cross sectional view of retainer apparatus 8 of FIG. 4B taken at cut away line 5A-5A of FIG. 4A, in accordance with embodiments of the present invention. In contrast to FIG. 4B, braking mechanism portion 31a comprises a latch (compression) mechanism 43a and a spring assembly 41a and braking mechanism portion 31b comprises a latch (compression) mechanism 43b and a spring assembly 41b. Latch mechanism 43a and spring 41a (i.e., compressed) are used to lock (or latch) first section 37a to second section 37b (i.e., as illustrated in FIG. 4C). In order to release first section 37a from second section 37b, latch mechanism 43a is disengaged from braking mechanism portion 31a and moved in a direction 46 thereby relieving pressure on first section 37a and second section 37b (and spring 41a). As latch mechanism 43a is moved in direction 46, compressed spring 41a is decompressed aiding in movement of latch mechanism 43a (in direction 46) and relieving pressure on first section 37a and second section 37b. The aforementioned process enables retainer portion 8b to slidably move along adjustable harness strap 4a. In order to lock or latch first section 37a to second section 37b (and enable braking mechanism portion 31a), latch mechanism 43a is moved in a direction 45 and locked to braking mechanism portion 31a thereby enabling pressure on first section 37a and second section 37b (and spring 41a). Latch mechanism 43b and spring 41b (i.e., compressed) are used to lock (or latch) first section 38a to second section 38b (i.e., as illustrated in FIG. 4C). In order to release first section 38a from second section 38b, latch mechanism 43b is disengaged from braking mechanism portion 31b and moved in a direction 47 thereby relieving pressure on first section 38a and second section 38b (and spring 41b). As latch mechanism 43b is moved in direction 47, compressed spring 41b is decompressed aiding in movement of latch mechanism 43b (in direction 47) and relieving pressure on first section 38a and second section 38b. The aforementioned process enables retainer portion 8a to slidably move along adjustable harness strap 4b. In order to lock or latch first section 38a to second section 38b (and enable braking mechanism portion 31b), latch mechanism 43b is moved in a direction 48 and locked to braking mechanism portion 31b thereby enabling pressure on first section 38a and second section 38b (and spring 41b).

FIG. 4D illustrates a second alternative cross sectional view of retainer apparatus 8 of FIG. 4B taken at cut away line 5A-5A of FIG. 4A, in accordance with embodiments of the present invention. In contrast to FIG. 4B, first section 37a and/or second section 37b of braking mechanism portion 31a each comprise teeth (or any other type of gripping structure) to lock first section 37a and second section 37b to adjustable harness strap 4a to prevent movement of retainer portion 8b. Additionally, first section 38a and/or second section 38b of braking mechanism portion 31b each comprise teeth (or any other type of gripping structure) to lock first section 38a and second section 38b to adjustable harness strap 4b to prevent movement of retainer portion 8a.

Figure 5A:
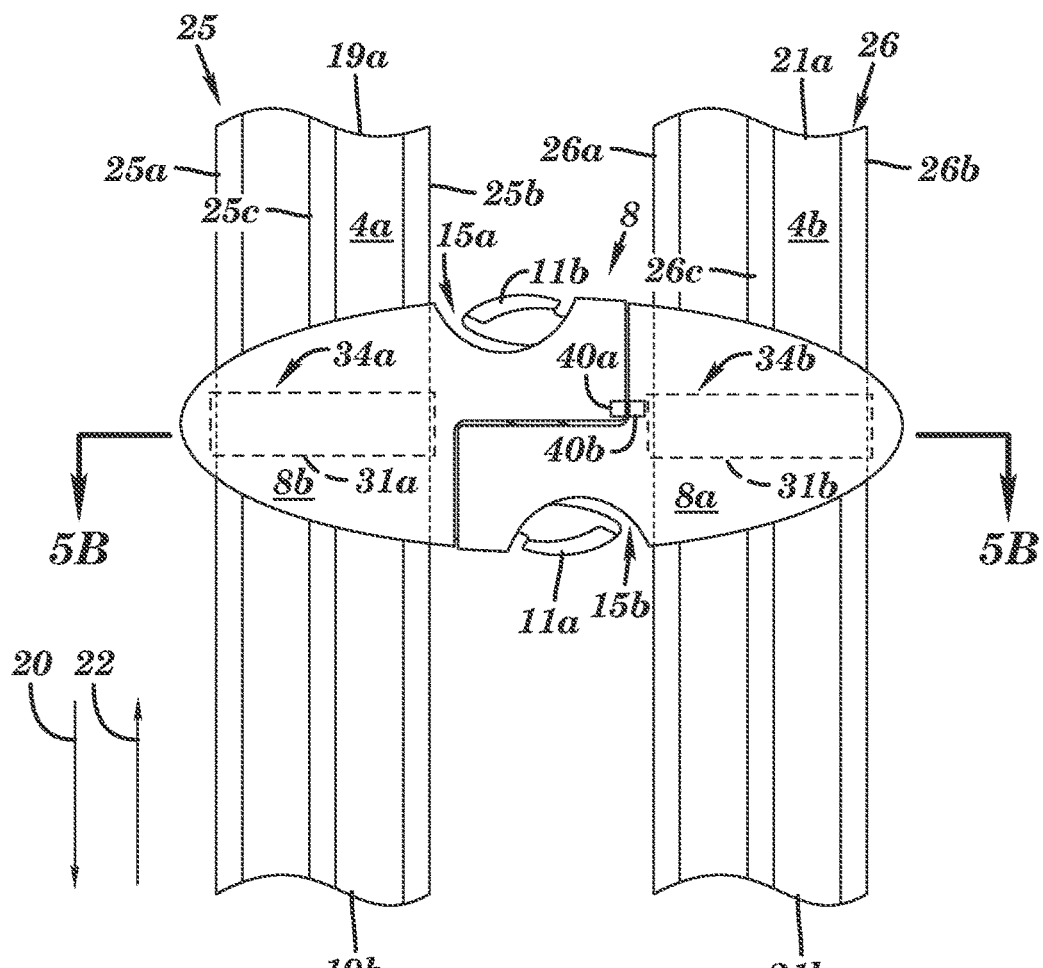
FIG. 5A illustrates an alternative to FIG. 4A, in accordance with embodiments of the present invention.

FIG. 5A illustrates an alternative to FIG. 4A, in accordance with embodiments of the present invention. In contrast to FIG. 4A, adjustable harness strap 4a comprises a track apparatus 25 that includes tracks 25a-25c and adjustable harness strap 4b comprises a track apparatus 26 that includes tracks 26a-26c. Note that although FIG. 5A illustrates track apparatus 25 comprising three tracks (tracks 25a-25c) and track apparatus 26 comprising three tracks (tracks 26a-26c), any number of tracks may be used. Track apparatus 25 enables retainer portion 8b to move along adjustable harness strap 4a (and tracks 25a-25c). In order to disable movement of retainer portion 8b, braking mechanism portion 31a is enabled to cause resistance to movement between tracks 25a-25c and braking mechanism 31a (e.g., braking mechanism comprises braking portions that grab tracks 25a-25c) thereby holding (or locking) retainer portion 8b in a stationary position at a user selected location anywhere on adjustable harness strap 4a. Track apparatus 25 additionally enables electrical motor/signal receiving device portion 34a (i.e., an electrical motor portion) to ride along tracks 25a-25c upon receiving a user command (i.e., for automatically adjusting a position of retainer portion 8b). Electrical motor/signal receiving device portion 34a (i.e., an electrical motor portion) may additionally be disabled to cause resistance to movement between tracks 25a-25c and electrical motor/signal receiving device portion 34a to hold (or lock) retainer portion 8b in a stationary position at a user selected location anywhere on adjustable harness strap 4a (i.e., in addition to or instead of using braking mechanism portion 31a). Track apparatus 26 enables retainer portion 8a to move along adjustable harness strap 4b (and tracks 26a-26c). In order to disable movement of retainer portion 8a, braking mechanism portion 31b is enabled to cause resistance to movement between tracks 26a-26c and braking mechanism 31b (e.g., braking mechanism comprises braking portions that grab tracks 26a-26c) thereby holding (or locking) retainer portion 8a in a stationary position at a user selected location anywhere on adjustable harness strap 4b. Track apparatus 26 additionally enables electrical motor/signal receiving device portion 34b (i.e., an electrical motor portion) to ride along tracks 26a-26c upon receiving a user command (i.e., for automatically adjusting a position of retainer portion 8a). Electrical motor/signal receiving device portion 34b (i.e., an electrical motor portion) may additionally be disabled to cause resistance to movement between tracks 26a-26c and electrical motor/signal receiving device portion 34b to hold (or lock) retainer portion 8a in a stationary position at a user selected location anywhere on adjustable harness strap 4b (i.e., in addition to or instead of using braking mechanism portion 31b). Tracks 25a-25c and 26a-26c may comprise any type of or shaped track including, inter alia, vertical type tracks, rectangular shaped tracks, triangular shaped tracks, circular shaped tracks, a zipper type track, etc. Tracks 25a-25c and 26a-26c may comprise any type of material including, inter alia, plastic, metal, magnetic, a frictional material, etc. Additionally, FIG. 5A illustrates cut away line 5B-5B applicable to the cross sectional view of FIG. 5B as described, infra.

Figure 5B:
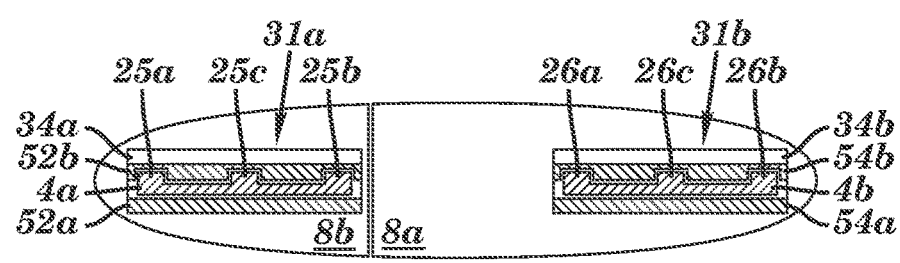
FIG. 5B illustrates a cross sectional view of the retainer apparatus of FIG. 5A, in accordance with embodiments of the present invention.

FIG. 5B illustrates a cross sectional view of retainer apparatus 8 taken at cut away line 5B-5B of FIG. 5A, in accordance with embodiments of the present invention. FIG. 5B illustrates a cross sectional view of retainer portions 8a and 8b, braking mechanism portions 31a and 31b, electrical motor/signal receiving device portions 34a and 34b, tracks 25a-25c and 26a-26c, and adjustable harness straps 4a and 4b. Braking mechanism portion 31a comprises a first section 52a and a second section 52b. In order to engage braking mechanism portion 31a, second section 52b (i.e., comprising braking devices on vertical sections of second section 52b) is enabled such that pressure is applied (i.e., by the braking devices (e.g., spring loaded braking devices, solenoid driven braking devices, etc) on vertical sections of second section 52b) to vertical sections of each of tracks 25a-25c thereby causing a resistance to movement between tracks 25a-25c (of adjustable harness strap 4a) and braking mechanism portion 31a (i.e., the braking devices on vertical sections of second section 52b) thereby holding (or locking) retainer portion 8b in a stationary position at a user selected location anywhere on adjustable harness strap 4a. Alternatively, second section 52b may comprise magnetic structures (e.g., electro/magnetic structures) on vertical sections of second section 52b and tracks 25a-25c comprise a metallic material capable of attraction to a magnetic field. In this case, engaging braking mechanism portion 31a includes enabling the electro/magnetic structures on vertical sections of second section 52b to generate a magnetic field thereby causing the electro/magnetic structures to magnetically hold the electro/magnetic structures to tracks 25a-25c. The aforementioned process holds (or locks) retainer portion 8b in a stationary position at a user selected location anywhere on adjustable harness strap 4a. Braking mechanism portion 31b comprises a first section 54a and a second section 54b. In order to engage braking mechanism portion 31b, second section 54b (i.e., comprising braking devices (e.g., spring loaded braking devices, solenoid driven braking devices, etc.) on vertical sections of second section 54b) is enabled such that pressure is applied (i.e., by the braking devices on vertical sections of second section 54b) to vertical sections of each of tracks 26a-26c thereby causing a resistance to movement between tracks 26a-26c (of adjustable harness strap 4b) and braking mechanism portion 31b (i.e., the braking devices on vertical sections of second section 54b) thereby holding (or locking) retainer portion 8a in a stationary position at a user selected location anywhere on adjustable harness strap 4b. Alternatively, second section 54b may comprise magnetic structures (e.g., electro/magnetic structures) on vertical sections of second section 54b and tracks 26a-26c comprise a metallic material capable of attraction to a magnetic field. In this case, engaging braking mechanism portion 31b includes enabling the electro/magnetic structures on vertical sections of second section 54b to generate a magnetic field thereby causing the electro/magnetic structures to magnetically hold the electro/magnetic structures to tracks 26a-26c. The aforementioned process holds (or locks) retainer portion 8a in a stationary position at a user selected location anywhere on adjustable harness strap 4b.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A retainer apparatus comprising:
   a first retainer portion configured to be slidably attached to a first adjustable harness strap of a car seat;
   a second retainer portion configured to be slidably attached to a second adjustable harness strap of the car seat, wherein said first retainer portion is removably attached to said second retainer portion;
   a transceiver;
   a sensor comprising a motion detector, wherein said motion detector is configured to detect movement of said retainer apparatus, and wherein said motion detector is configured to transmit a warning signal, via said transceiver, to a controller within a vehicle comprising said retainer apparatus to alert a user in said vehicle if said movement of said retainer apparatus is detected; and
   a braking mechanism configured to resist movement of said first retainer portion and said second retainer portion along said first adjustable harness strap and said second adjustable harness strap, wherein said braking mechanism comprises a braking device configured to apply resistance to said first adjustable harness strap and said second adjustable harness strap to hold at least one of said first retainer portion and said second retainer portion in a first stationary position along at least one of said first adjustable harness strap and said second adjustable harness strap, wherein said braking mechanism further comprises an electro/mechanical device configured to apply mechanical pressure to said braking device, and wherein said transceiver, said sensor, and said braking mechanism are contained within at least one of said first retainer portion and said second retainer portion.

2. The retainer apparatus of claim 1, wherein said movement comprises said first retainer portion being disconnected from said second retainer portion.

3. The retainer apparatus of claim 1, wherein said movement comprises said moving along said first adjustable harness strap and said second adjustable harness strap.

4. The retainer apparatus of claim 1, wherein said user is a driver of said vehicle.

5. The retainer apparatus of claim 1, wherein said retainer apparatus, said first adjustable harness strap and said second adjustable harness strap are comprised by a harness apparatus mechanically attached to said car seat, and wherein said harness apparatus is configured to restrain an occupant of said car seat and prevent said occupant from being ejected from said car seat.

6. The retainer apparatus of claim 1, wherein said transceiver comprises a wireless transceiver.

7. The retainer apparatus of claim 1, wherein said braking mechanism is configured to resist movement of said first retainer portion and said second retainer portion along said first adjustable harness strap and said second adjustable harness strap respectively, wherein said braking mechanism comprises said braking device configured to apply resistance to said first adjustable harness strap and said second adjustable harness strap respectively to hold said retainer apparatus in multiple stationary positions along said first adjustable harness strap and said second adjustable harness strap.

8. The retainer apparatus of claim 7, wherein said braking mechanism further comprises a magnetic structure configured to apply said resistance.

9. A retainer apparatus comprising:
a first retainer portion configured to be slidably attached to a first adjustable harness strap of a car seat;
a second retainer portion configured to be slidably attached to a second adjustable harness strap of said car seat, wherein said first retainer portion is removably attached to said second retainer portion;
a sensor comprising a motion detector and an alarm, wherein said motion detector is configured to detect movement of said retainer apparatus, and wherein said alarm is configured to alert a user if said movement of said first retainer apparatus is detected; and
a braking mechanism configured to resist movement of said first retainer portion and said second retainer portion along said first adjustable harness strap and said second adjustable harness strap, wherein said braking mechanism comprises a braking device configured to apply resistance to said first adjustable harness strap and said second adjustable harness strap to hold at least one of said first retainer portion and said second retainer portion in a first stationary position along at least one of said first adjustable harness strap and said second adjustable harness strap, wherein said braking mechanism further comprises an electro/mechanical device configured to apply mechanical pressure to said braking device, and wherein said sensor and said braking mechanism are contained within at least one of said first retainer portion and said second retainer portion.

10. The retainer apparatus of claim 9, wherein said alarm is located within said sensor, and wherein said motion detector is configured to activate said alarm.

11. The retainer apparatus of claim 9, wherein said movement comprises said first retainer portion being disconnected from said second retainer portion.

12. The retainer apparatus of claim 9, wherein said movement comprises said moving along said first adjustable harness strap and said second adjustable harness strap.

13. The retainer apparatus of claim 9, wherein said retainer apparatus, said first adjustable harness strap and said second adjustable harness strap are comprised by a harness apparatus mechanically attached to said car seat, and wherein said harness apparatus is configured to restrain an occupant of said car seat and prevent said occupant from being ejected from said car seat.

14. The retainer apparatus of claim 9, wherein said braking mechanism is configured to resist movement of said first retainer portion and said second retainer portion along said first adjustable harness strap and said second adjustable harness strap respectively, wherein said braking mechanism comprises said braking device configured to apply resistance to said first adjustable harness strap and said second adjustable harness strap to hold said retainer apparatus in multiple stationary positions along said first adjustable harness strap and said second adjustable harness strap.

15. The retainer apparatus of claim 14, wherein said braking mechanism further comprises a magnetic structure configured to apply said resistance.

16. A car seat apparatus comprising:
a first adjustable harness strap;
a second adjustable harness strap;
a retainer apparatus comprising a first retainer portion slidably attached to said first harness strap and a second retainer portion slidably attached to said second harness strap, wherein said first retainer portion is removably attached to said second retainer portion, wherein said retainer apparatus further comprises a transceiver and a sensor comprising a motion detector, wherein said motion detector is configured to detect movement of said retainer apparatus, wherein said motion detector is configured to transmit a warning signal, via said transceiver, to a controller within a vehicle comprising said car seat apparatus to alert a user in said vehicle if said movement of said retainer apparatus is detected, wherein said retainer apparatus further comprises a braking mechanism configured to resist movement of said first retainer portion and said second retainer portion along said first adjustable harness strap and said second adjustable harness strap, wherein said braking mechanism comprises a braking device configured to apply resistance to said first adjustable harness strap and said second adjustable harness strap to hold at least one of said first retainer portion and said second retainer portion in a first stationary position along at least one of said first adjustable harness strap and said second adjustable harness strap, wherein said braking mechanism further comprises an electro/mechanical device configured to apply mechanical pressure to said braking device, and wherein said transceiver, said sensor, and said braking mechanism are contained within at least one of said first retainer portion and said second retainer portion; and
a car seat structure comprising a harness apparatus mechanically attached to said car seat structure, wherein said retainer apparatus, said first adjustable harness strap, and said second adjustable harness strap are comprised by said harness apparatus, and wherein said harness apparatus is configured to restrain an occupant of said car seat apparatus and prevent said occupant from being ejected from said car seat apparatus.

17. The car seat apparatus of claim 16, wherein said movement comprises said first retainer portion being disconnected from said second retainer portion.

18. The car seat apparatus of claim 16, wherein said movement comprises said moving along said first adjustable harness strap and said second adjustable harness strap.

19. The car seat apparatus of claim 16, wherein said transceiver comprises a wireless transceiver.

20. The car seat apparatus of claim 16, wherein said braking mechanism is configured to resist movement of said first retainer portion and said second retainer portion along said first adjustable harness strap and said second adjustable harness strap respectively, wherein said braking mechanism comprises said braking device configured to apply resistance to said first adjustable harness strap and said second adjustable harness strap respectively to hold said retainer apparatus in multiple stationary positions along said first adjustable harness strap and said second adjustable harness strap.

\* \* \* \* \*